United States Patent [19]
Rejeski

[11] 3,962,019
[45] June 8, 1976

[54] FLOATING MANDREL DUCT MAKING APPARATUS
[75] Inventor: William E. Rejeski, Farmington, Conn.
[73] Assignee: The Wiremold Company, West Hartford, Conn.
[22] Filed: June 16, 1975
[21] Appl. No.: 587,162

[52] U.S. Cl. ............................ 156/428; 156/143; 156/195; 156/429
[51] Int. Cl.² ........................................ B65H 81/00
[58] Field of Search.... 156/143, 144, 446, 425–432, 156/175, 195; 93/80; 228/145; 72/49, 142

[56] References Cited
UNITED STATES PATENTS

| | | | |
|---|---|---|---|
| 2,592,336 | 4/1952 | Reveski | 72/49 |
| 2,731,070 | 1/1956 | Meissner | 156/143 |
| 3,272,678 | 9/1966 | Swan | 156/429 |
| 3,300,812 | 1/1967 | Pasquetti | 156/195 X |
| 3,567,101 | 3/1971 | Ranne | 93/80 UX |

*Primary Examiner*—William A. Powell
*Assistant Examiner*—David A. Simmons
*Attorney, Agent, or Firm*—Prutzman, Hayes, Kalb & Chilton

[57] ABSTRACT

Apparatus for generating wire reinforced tubular duct featuring a cantilever mounted mandrel supported for rotation and serving as a supporting surface about which lapping wraps of flexible strip of duct material are formed along a helical path around and forwardly off the mandrel. A helical guide fixed in relation to the mandrel and an endless drive belt coact to drive the flexible duct material along its helical path with the drive belt serving to advance the flexible duct material axially along the mandrel and to rotate the mandrel.

27 Claims, 7 Drawing Figures

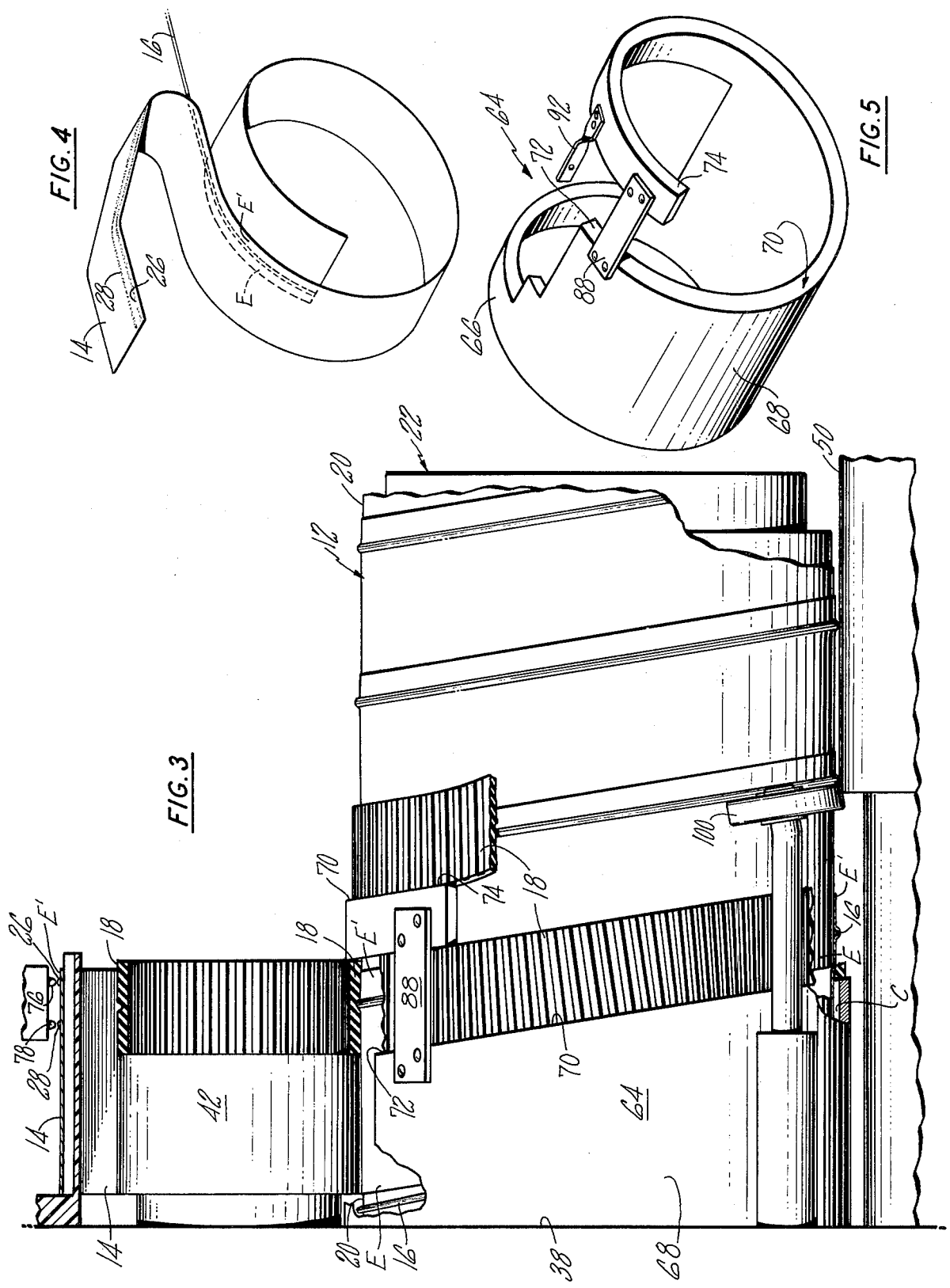

FLOATING MANDREL DUCT MAKING APPARATUS

This invention generally concerns automatic production apparatus for making wire reinforced flexible duct and particularly concerns apparatus of a type incorporating a free-wheeling drum or floating mandrel on which the duct is generated.

A primary object of this invention is to provide an improved duct making apparatus particularly suited for high speed operation.

Another object of this invention is to provide such an apparatus incorporating a new and improved duct generating mechanism which features a floating mandrel and a single outside drive belt which rotates the mandrel and advances reinforcing wire and flexible strip material in a controlled manner along a helical path about the floating mandrel to generate wire reinforced, form-sustaining duct in a continuous synchronized process.

Still another object of this invention is to provide an apparatus of the above-described type which utilizes hot melt adhesive for bonding adjacent overlapped wraps of strip material about the reinforcing wire in a high production operation to completely encase the wire in a helical seam extending the length of the duct.

A further object of this invention is to provide an improved apparatus of the type described capable of quality production in an automatic operation for use with a variety of materials ranging from thin films for heating, ventilating and air conditioning duct to heavy coated fabrics e.g., for industrial applications.

Still another object of this invention is to provide such an apparatus which is quick and easy to set up and disassemble with minimum downtime and which enables the duct to be rapidly and inexpensively manufactured without requiring coated wire, vulcanization, duct supporting backing material, heat treating or vacuum application frequently associated with conventional apparatus of this type.

Other objects will be in part obvious and in part pointed out more in detail hereinafter.

A better understanding of this invention will be obtained from the following detailed description and the accompanying drawings of an illustrative application of this invention.

In the drawings:

FIG. 3 is an enlarged left side, partly broken away and partly in section, of the wrapping device;

FIG. 4 is an isometric view, partly broken away and partly in section, showing the feed path of a flexible strip of sheet material as it enters the duct forming wrapping device;

FIG. 5 is an isometric view, partly broken away, showing a guide member of the wrapping device;

Figure 6:
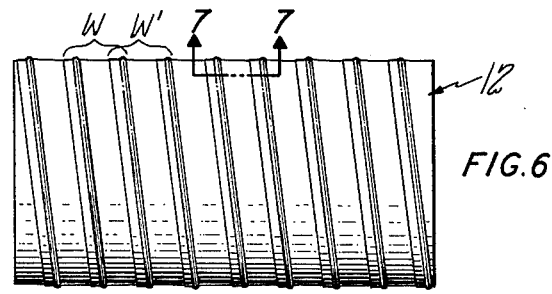
FIG. 6 is a side view of the flexible duct formed by the apparatus embodying this invention.
Figure 7:
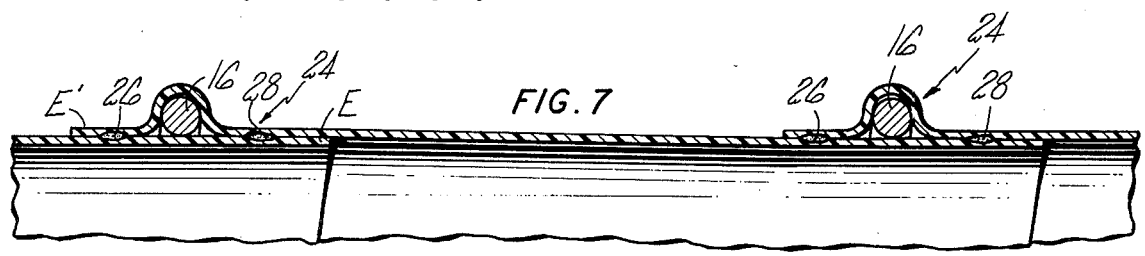
FIG. 7 is an enlarged, fragmentary longitudinal section view taken generally along lines 7—7 of FIG. 6.

With reference to the drawings, an apparatus 10 showing a preferred embodiment of this invention is illustrated which is particularly designed to manufacture tubular duct 12 (FIG. 6) by a continuous process. Flexible duct strip material 14 and reinforcing wire 16 are driven in synchronism by a single outside drive belt 18 along a helical path about a cylindrical working surface 20 of a free-wheeling drum or floating mandrel 22 to overlap lateral edges E and E' of consecutive wraps W and W' of the strip material 14 about the wire 16 (FIG. 7) to form a self-sustaining duct with a continuous helical seam 24 bonded by twin adhesive beads 26, 28 and extends the length of the duct 12.

As described in my patent application Ser. No. 515,056 entitled "Reinforced Flexible Duct" filed Oct. 15, 1974 and assigned to the assignee of this invention, the duct 12 is composed of the flexible strip material 14 supported by convolutions of helical wire 16 encased in a helical pocket or seam 24 formed between continuous twin tracks or beads 26, 28 of adhesive which bond a trailing edge E of one wrap W with an overlapping leading edge E' of the next succeeding wrap W' of strip material 14.

Different flexible materials are contemplated for use with this invention in the manufacture of tubular duct. i.e., the invention contemplates the use of textile substitutes such as bonded fiber fabrics or nonwoven fabrics and also much heavier elastomeric, textile or similar fabric materials which may be composed of or bear coatings of elastomer or thermoplastic for industrial applications. This invention is particularly useful in making duct of a soft thin film impervious to passage of gas and which is useful as a liner in air conditioning ducts or as duct for various heating and ventilation applications. Such thin film materials have thicknesses ranging from approximately 0.25 mil to 2 mil and include use of films of polyvinyl fluoride, polyesters and similar tough, lightweight, durable thermoplastic film.

Referring to the apparatus 10, a roll 30 in strip form of flexible sheet material is mounted on an unwind wheel 32 to be fed along a feed path defined by tension roller 34 and guide rollers 36 schematically shown in the drawings. It will be understood that the illustrated unwind wheel 32 and rollers 34, 36 are rotatably mounted on a frame 38 of the apparatus 10. The strip 14 passes under a "hot melt" adhesive applicator 40 to a tension belt roller 42, adjustably mounted on the frame 38, and then downstream from roller 42 to a reversing roller 44 and to a wrapping device 45 for forming the duct 12.

The wrapping device 45 includes the mandrel 22 cantilever mounted on the frame 38 and supported by suitable bearing means such as at 46 for free-wheeling rotation on a support shaft 48 fixed to the frame 38. The cylindrical surface 20 of the mandrel serves as a working surface on which the duct is formed, and is of a diameter desired for the inside duct diameter but is significantly shorter than the length of the duct to be formed. In the preferred embodiment, the mandrel 22 is shown having a free end of reduced diameter to facilitate the completely formed duct 12 to pass off forwardly from the free end of mandrel 22 onto a pair of elongated discharge rolls 50, 50 longitudinally extending parallel to and below mandrel 22. The discharge rolls 50, 50 are suitably mounted to freely rotate and to support the completed duct as it emerges with a spinning motion from the mandrel 22.

To lay the strip 14 and reinforcing wire 16 on the mandrel and to advance the strip and wire forwardly of the mandrel 22 in a controlled manner axially along its working surface 20 in accordance with this invention, the wrapping device features a single outside drive belt 18 which not only rotates the mandrel 22 to effect the rotary motion required but also advances the strip 14 and wire 16 axially of the mandrel with adjacent wraps of the strip 14 in continuous uniform edge lapping relation about the wire 16 to form the helical seam 24.

More specifically, the mandrel 22 is positively driven by a portion of the drive belt 18, particularly, a turn of slightly over 360° which is trained helically about the mandrel 22 in overlying driving engagement with adjacent lapping edges of the strip 14. The drive belt 18 is shown as an endless belt having a timing belt drive surface on one side which passes over a drive roller 52. The drive roller is suitably mounted on frame 38 and connected to drive components, not shown, for rotating the drive roller 52 under the power of a motor 54 in accordance with well-known techniques. The drive belt 18 passes over tensioning rollers 56, 58 adjustably mounted on the frame 38 for selectively varying the position of the rollers 56, 58, and the belt 18 is trained between a pair of idler rollers 60, 62 upstream of the hot melt adhesive applicator 40 below which the drive belt 18 is fed prior to be trained around the adjacent tension belt roller 42 which will also be understood to be mounted for adjustable positioning on the frame 38.

To establish a helical path for the strip 14 and wire 16, the drive belt 18 is trained about the floating mandrel 22 with a pitch established by a guide 64 of the wrapping device 45. The guide 64 has a rear wall 66 fixed in position on the frame 38 with a parti-cylindrical side wall 68 which projects outwardly in surrounding spaced relation to mandrel 22 to provide a preselected clearance between guide 64 and the mandrel working surface 20. The side wall 68 of the guide 64 has a contoured guide surface 70 formed thereon to extend perpendicular to the working surface 20 in a helix about mandrel 22 to engage a trailing edge of belt 18. Thus, a helical path for about one turn of the belt 18 about mandrel 22 is established by guide 64 which also maintains belt 18 spaced apart at an entrance end 72 and exit end 74 of the helical guide surface 70 and minimizes any undesired surface walking of drive belt 18 relative to mandrel 22.

Figure 2:
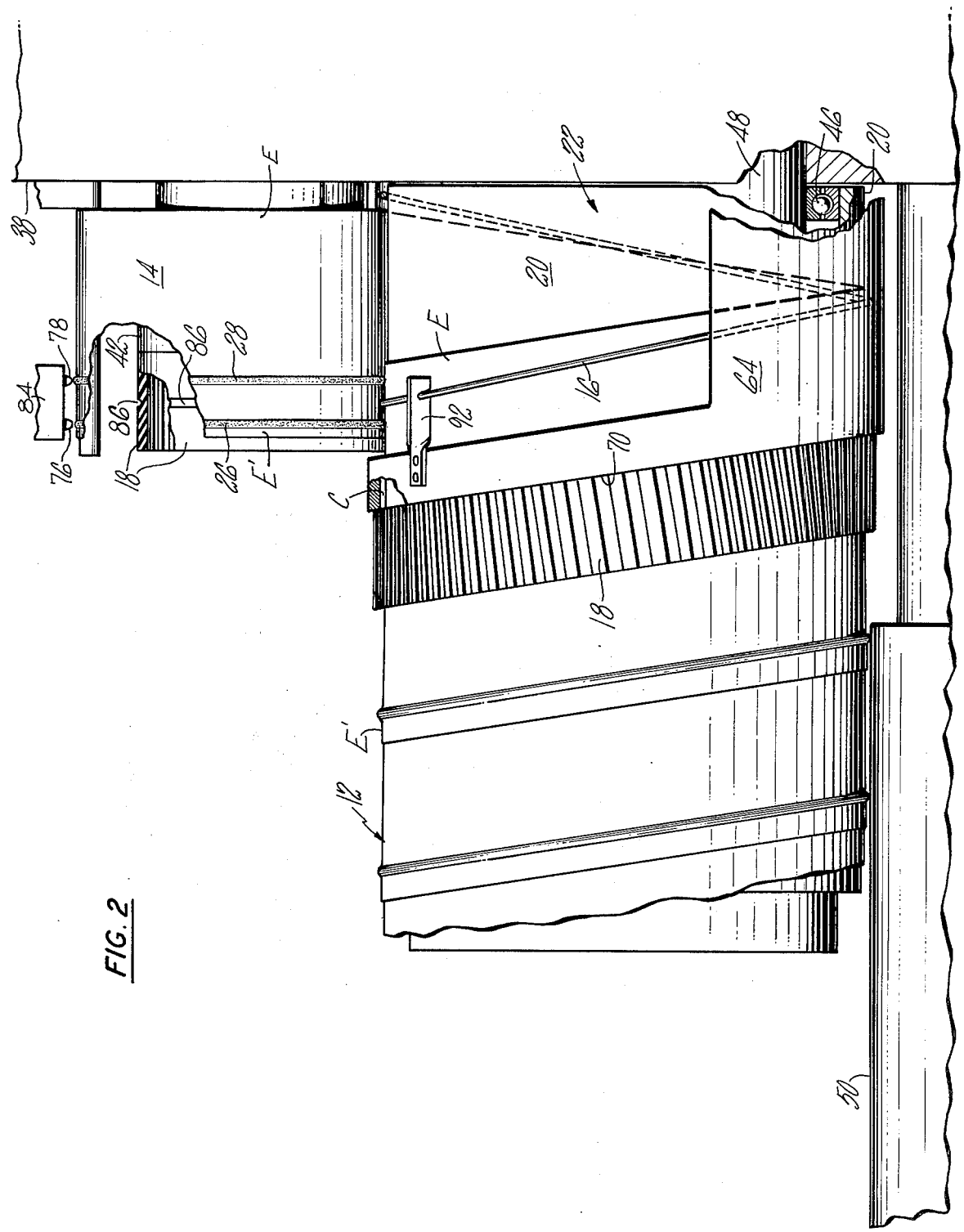
FIG. 2 is an enlarged right side view, partly broken away and partly in section, showing a duct forming wrapping device of the apparatus.

As best seen in FIGS. 2 and 3, drive belt 18 advances below the adhesive applicator 40 and over the surface of tension roller 42 generally in coextensive alignment with a leading edge E' of the overlying strip material to enter the entrance end 72 of helical guide surface 70. The adhesive applicator 40 discharges continuous twin beads or tracks 26, 28 of so-called hot melt adhesive from a pair of orifices 76, 78 onto the leading edge E' of the strip material 14 as it passes under applicator 40. It will be understood that the applicator 40 is supplied with adhesive in a molten state through tubing 80 connected to a reservoir and pump assembly 82, for supplying the adhesive under pressure in a continuous even flow of hot melt adhesive to ensure uniform deposition of the spaced twin tracks 26, 28 on the strip material 14, the orifices 76, 78 being provided in suitable nozzle means 84 which is adjustable to vary the spacing between the twin tracks 26, 28.

After passing over reversing roller 44, the side of the strip material 14 bearing the adhesive is reversed to face downwardly with its opposite side then engaging the drive belt 18 passing about tension roller 42 adjacent entrance end 72 of helical guide surface 70. This entrance end 72 of guide surface 70 is at an upstream point thereon adjacent the top of working surface 20 where belt 18 is tangential to the working surface 20 of the mandrel 22 and passes off the bottom of the overlying tension roller 42. The illustrated flat side of belt 18, opposite its timing belt drive surface, is engageable with the leading edge E' of the confronting side of the strip material 14 which is opposite its adhesive bearing side. The flat side of belt 18 is formed with an uninterrupted longitudinally extending center groove 86. The entrance end portion of guide surface 70 and the forwardly spaced offset exit portion of guide 64, which are interconnected by bracket 88, form an entrance guideway (FIG. 3) maintains the drive belt with its groove 86 symmetrically located midway between the underlying twin tracks 26, 28 of adhesive on the leading edge E' of the downwardly facing opposite side of the wrap W' which overlaps the trailing edge E of the preceding wrap W.

Figure 1:
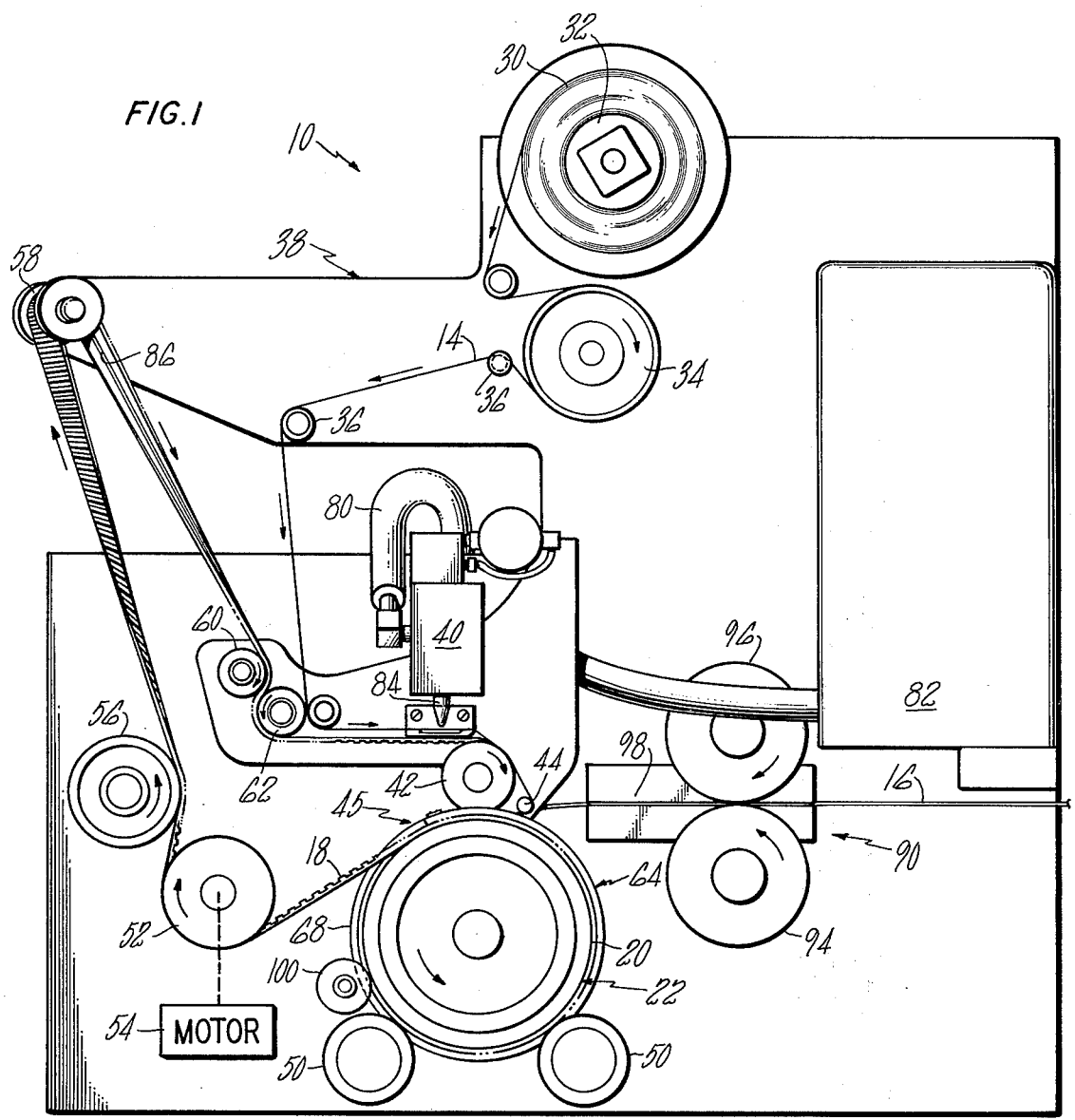
FIG. 1 is a schematic front view of a tubular duct forming apparatus incorporating an embodiment of this invention.

As seen in FIGS. 1 and 2, a wire feeding mechanism 90 of the wrapping device 45 discharges reinforcing wire 16 to register with the drive belt groove 86 upon wire 16 passing through a guide opening in a pin 92 mounted on the side wall 68 upstream of the entrance end 72 of helical guide surface 70. Accordingly, the wire 16 is received adjacent the entrance end 72 of the helical guide surface 70 between overlapping edges E and E' of adjacent wraps W and W' of strip material 14 and in registration with the center groove 86 of the overlying drive belt 18 whereby the drive belt 18 positively and precisely locates and maintains the incoming wire 16 between the twin tracks 26, 28 of adhesive on the overlying wrap W' of strip material 14.

By virtue of the above-described construction, the leading edge of the first wrap of strip material 14 of a duct to be formed is wound under belt 18 about mandrel 22 with a portion of the wrap trailing the belt 18 and extending through the clearance C between the guide side wall 68 and the mandrel working surface 20. During machine set up, the pitch of the helical guide surface 70, relative to the working surface 20 of the mandrel 22, and the drive belt width are selectively dimensioned and configured in relation to the width of the strip 14 such that the one turn of the belt 18 about mandrel 22 displaces the underlying leading edge E' of each wrap of strip material axially of the mandrel 22 a distance sufficient to ensure overlap of its trailing edge E with the leading edge E' of the following wrap adjacent the entrance end 72 of the helical guide surface 70. I.e., it is ensured during such machine set up that the trailing edge E of the first wrap W or convolution of the strip 14 is located in underlying lapping relation to the twin tracks 26, 28 of adhesive on the leading edge E' of the following wrap W' at the entrance end 72 of the guide surface 70. During operation, as the leading edge E' of each wrap passes the entrance end 72 of the guide surface 70, the drive belt 18 compresses the lapping edges E, E' of the strip material 14 against mandrel 22, and the hot melt adhesive secures the lapped edges in a tough, strong bond encasing wire 16 in the seam 24 formed between wraps W, W' of the tubular duct 12 being formed.

High production operation is in part achieved by use of hot melt type adhesives. The twin tracks 26, 28 of adhesive, when compressed between the engageable edge surfaces of the lapping strip material with the adhesive in a molten state at an elevated temperature, rapidly cool to solidify and bond to secure seam 24 without requiring evaporation of solvents, subsequent heating and curing or vulcanization. It has been found that with such hot melt adhesives, the duct 12 is firmly adhered with the form sustaining reinforcing wire 16 securely housed within the pocket of the helical seam 24 upon passing out from under only a single turn of the drive belt 18 at the exit end 74 of the guide surface 70. High quality seams are further ensured by adjustment of the position of rollers 42, 56 and 58 to uniformly and longitudinally tension the single turn of the drive belt 18 about the mandrel 22 such that lapping wraps of strip material 14 are driven at uniform surface speed along the working surface 20 of the mandrel 22, rollers 42 and 56 serving as anti-slack units and being selectively adjustable for controlling tensioning of the belt 18 about mandrel 22. It has also been found that substantial operating speeds have been achieved, e.g., the generation of duct at about 600 feet per minute when a hot melt adhesive selected from the polyamide family, such as nylon, has been deposited at a temperature of about 400°F on thin film strip material such as polyvinyl fluoride.

The surface speed of the drive belt 18 and flexible strip material 14 is suitably synchronized with the speed of the incoming wire fed to the entrance end 72 of guide surface 70. In the preferred embodiment, wire feeding mechanism 90 is shown as an independently power operated unit which will be understood to be connected to any conventional drive, not shown, to rotate a drive roller 94 which frictionally engages wire 16 received between drive roller 94 and backup roller 96 to push wire 16 into registration with the drive belt groove 86 adjacent entrance end 72 of the guide surface 70, the rollers 94 and 96 being supported for rotation on frame 38. The drive roller 94 may be rotated at a constant speed to push wire 16 into a wire guideway 98 on the frame 38 and which confronts an open portion of the guide side wall 68, whereby wire 16 may be discharged into the interior of the guide 64 near its uppermost portion adjacent rear wall 66 to follow the contour of the interior surface of the side wall 68 to preform the wire 16 into a helical loop advancing circumferentially about mandrel 22 as best seen in FIG. 2. Mandrel 22 will be understood to be of sufficiently reduced diameter relative to guide side wall 68 to provide adequate clearance therebetween to permit the wire looping. Any suitable control means, not shown, may be utilized to vary the angular speed of the belt drive roller 52 in response to any variation in the speed at which the wire loop passes through the opening of guide pin 92 to merge with the wraps of the strip for precisely synchronizing the speeds of the wire 16 and the strip 14.

If desired, a roller such as that shown at 100 rotatably mounted on a free end of an arm 102, which may be secured to frame 38 is located just beyond the exit end 74 of guide surface 70 for engaging the duct to ensure that each wrap of the completed duct 12 passing beyond the drive belt 18 is extended to facilitate cutting the wire within the seam 24 to divide the duct into section during manufacture. Since a multiplicity of completely formed wraps of duct 12 may be passed off the free end of the mandrel 22 and compressed while on discharge rolls 50, 50, any cutting mechanism, not shown, might undesirably cut multiple turns of wire beyond the exit end 74 of the guide surface 70 without a unit such as roller 100 to engage and maintain the trailing end of the duct in an extended condition during cutting.

An apparatus utilizing the above-described features serves to eliminate any backing material frequently required in conventional machines of this type for supporting the duct material, the backing material later being required to be removed. In the construction of this invention, the floating mandrel itself serves to support the material, even thin films, so as to generate the desired duct in a simplified automatic, high speed production operation. The cost of material itself is reduced by completely eliminating any need for wire coating, frequently found to be required in other production techniques, since the lapping wraps of the strip material itself effectively encases the wire. Use of the hot melt adhesive technique in conjunction with the floating mandrel and the single outside drive belt arrangement eliminates any need for subsequent heating or curing and further enhances the speed of the disclosed apparatus. The resulting duct material has been found to exhibit a tough, strong bond at its seam and satisfactory shelf life. Moreover, this invention is usable with a variety of different materials as well as being flexible with respect to the type and thickness of the strip materials used so as to customize the finished duct to match the requirements of its application.

As will be apparent to persons skilled in the art, various modifications, adaptations and variations of the foregoing specific disclosure can be made without departing from the teachings of this invention.

I claim:

1. In a tubular duct making apparatus including a frame having feeding means for feeding a strip of sheet material, a wrapping device for forming the strip into continuous lapping wraps defining a generally tubular duct and comprising a mandrel supported on the frame for rotation, a guide mounted on the frame and having a contoured helical surface in fixed surrounding relation to the mandrel, and a power operated drive for rotating the mandrel and simultaneously pulling the strip from the feeding means about the mandrel along a helical path established by the mandrel and the helical surface of the guide.

2. The apparatus of claim 1 wherein the drive and the helical surface of the guide are engageable with one another and cooperate to displace each wrap of the strip material axially of the mandrel such that adjacent wraps of the strip are in edge lapping relation.

3. The apparatus of claim 2 wherein the edge of each wrap overlaps the edge of an adjacent leading wrap of the strip as the strip advances along a working surface of the mandrel in forming the tubular duct.

4. The apparatus of claim 1 wherein the drive includes an endless drive belt supported on the frame and having a belt portion trained about the mandrel, the helical guide surface having entrance and exit ends and being engageable intermediately thereof with said portion of the belt trained about the mandrel.

5. The apparatus of claim 4 wherein adjacent wraps of the strip are maintained in edge lapping relation by said belt portion between the entrance and exit ends of the helical guide surface.

6. The apparatus of claim 5 wherein said belt portion is in overlying engagement with the lapped edges of adjacent wraps of the strip intermediate the entrance and exit ends of the helical guide surface.

7. The apparatus of claim 6 wherein wire feeding means is provided for feeding wire between the lapping wraps of the strip, wherein adhesive depositing means is provided for depositing adhesive in twin beads on one of the lapped edges of the strip in longitudinally extending alignment therewith for adhesively bonding the other of the lapped edges of the strip with the wire therebetween, and wherein said belt portion trained about the mandrel presses the lapped edges into engagement with the wire encased between adhesively secured lapping wraps of the strip.

8. The apparatus of claim 4 wherein the belt portion comprises a turn of the belt wound about 360° around and forwardly of the mandrel in a helical path, and wherein the entrance and exit ends of the helical guide surface are located adjacent tangential points of the belt relative to the mandrel.

9. The apparatus of claim 4 further including an adhesive applicator mounted on the frame adjacent a feed path of the strip upstream of the mandrel for depositing adhesive onto a leading edge of the strip in a pair of spaced aligned beads, and wire feeding means for supplying wire between lapped edges of adjacent wraps of the strip adjacent the entrance end of the helical guide surface in alignment with and intermediately of the adhesive beads.

10. The apparatus of claim 9 wherein the adhesive applicator is a hot melt type applicator for depositing adhesive in a molten state onto the strip for relatively rapid cooling and bonding upon contact with the lapping wraps of the strip to form a helical seam.

11. The apparatus of claim 9 wherein a strip engaging side of the drive belt has an uninterrupted longitudinally extending groove therein, and wherein the wire fed to the entrance end of the helical guide surface is registrable with said groove in the belt, adjacent lapping wraps of the strip, upon being driven along said helical path, being compressively engaged by the drive belt with the adjacent wraps of the strip and the wire continuously maintained in controlled alignment by said portion of the drive belt trained about the mandrel to secure the lapping edges of the strip about the wire in an adhesively bonded helical seam.

12. The apparatus of claim 9 including operating means for operating the wire feeding means to supply wire in timed relation to the surface speed of the strip material being wrapped about the mandrel.

13. The apparatus of claim 1 wherein the mandrel has a generally cylindrical working surface, and wherein the guide comprises a generally cylindrical member having an interrupted side wall defining said contoured helical surface, said contoured helical surface extending normal to the working surface of the mandrel.

14. The apparatus of claim 13 wherein the drive includes an endless drive belt supported on the frame with a portion trained about the mandrel and cooperating with said helical guide surface for applying a tangential force to the strip to rotate the mandrel and to positively drive and control the strip axially along its working surface to displace each wrap of the strip for edge overlapping engagement with the adjacent following wrap.

15. High speed apparatus for making tubular duct comprising a frame, a cylindrical mandrel rotatably mounted on the frame, a helical guide surface extending about the mandrel in perpendicular fixed relation thereto, the guide surface having an entrance end and an exit end, feeding means for feeding a strip of sheet material to the entrance end of the helical guide surface, a plurality of rotary supports mounted on the frame, and a power operated endless belt supported on the rotary supports with a length of the belt trained about the mandrel between the entrance end and exit end of the guide surface, the belt serving to rotate the mandrel and pull the strip from the feeding means about the mandrel between said entrance and exit ends of the guide surface with said length of the belt trained about the mandrel being in overlying engagement with lapping edges of adjacent wraps of the strip for applying a driving force thereto, the belt and the guide surface being engageable to positively advance each wrap of the strip axially of the mandrel for overlapping engagement of its trailing edge by the leading edge of the adjacent following wrap.

16. The apparatus of claim 15 wherein one of the rotary supports is power operated to drive the endless belt.

17. The apparatus of claim 15 wherein the rotary supports include first and second anti-slack units engaging the endless belt upstream and downstream of the mandrel, at least one of said first and second anti-slack units being selectively adjustable for controlling the tensioning of the length of the endless belt trained around the mandrel.

18. The apparatus of claim 15 further including a hot melt adhesive applicator for applying hot melt adhesive to the sheet material strip upstream of the mandrel such that, upon overlapping an adjacent leading wrap, the adhesive bonds adjacent wraps of the strip in aligned relation to one another to be driven from the surface of the mandrel in tubular form.

19. The apparatus of claim 15 wherein power operated wire feeding means is provided for supplying wire in timed relation to movement of the strip about the mandrel, the wire feeding means supplying wire to the entrance end of the guide surface to be interposed and adhesively bonded between lapping edges of said adjacent wraps of the strip to form a tubular duct having a wire reinforced helical seam.

20. The apparatus of claim 19 further including adhesive depositing means for depositing adhesive in twin beads on one of the lapping edges of the strip in longitudinally extending alignment therewith for adhesively bonding said one edge with the other of the lapping edges of the strip with the wire therebetween.

21. The apparatus of claim 19 wherein the belt has an uninterrupted longitudinally extending groove therein registrable with the wire fed to the entrance end of the helical guide surface for continuously maintaining adjacent wraps of the strip and the wire in controlled alignment throughout the advance of the strip axially of the mandrel between said entrance and exit ends of the guide surface.

22. The apparatus of claim 19 further including duct extension means for engaging completed duct adjacent said exit end of the helical guide surface for maintaining the completed duct in extended condition to facilitate severing of a single wire upon completion of a desired length of duct.

23. The apparatus of claim 15 wherein the guide includes a generally cylindrical side wall in surrounding spaced relation to the mandrel to establish a clearance therebetween, the side wall having a rear end fixed to the frame, the side wall being interrupted to define said helical guide surface.

24. The apparatus of claim 23 wherein the intermediate portion of each wrap of the strip between its belt engaged leading and trailing edges is advanced axially of the mandrel through the clearance between the guide side wall and the mandrel.

25. The apparatus of claim 23 wherein the exit end of the guide surface defines a forward end of the guide side wall opposite its rear end, the entrance end of the helical guide surface being intermediate the opposite ends of the guide, wherein power operated wire feeding means supplies wire to the guide adjacent the rear end of its side wall, the side wall of the guide having an interior surface engageable with the wire for deforming it into a continuous loop extending between the interior side wall guide surface and the mandrel, and wherein wire guide means is provided adjacent the entrance end of the helical guide surface for guiding the looped wire between lapping edges of said adjacent wraps of the strip.

26. The apparatus of claim 15 further including a pair of elongated discharge rollers extending in underlying parallel relation to the rotational axis of the mandrel for receiving an extended continuous length of completed tubular duct upon its being advanced axially off a free end of the mandrel.

27. The apparatus of claim 1 wherein the mandrel is cantilever supported on the frame at one end of the mandrel for rotation.

* * * * *